J. J. GOUGH.
SHIELD FOR MOTOR VEHICLES.
APPLICATION FILED DEC. 7, 1920.
1,413,475.
Patented Apr. 18, 1922.
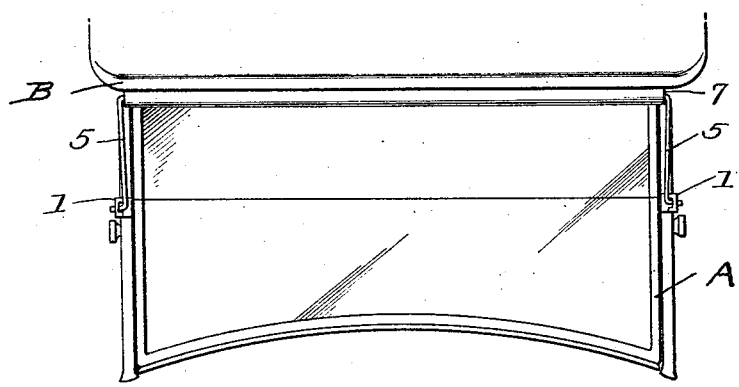
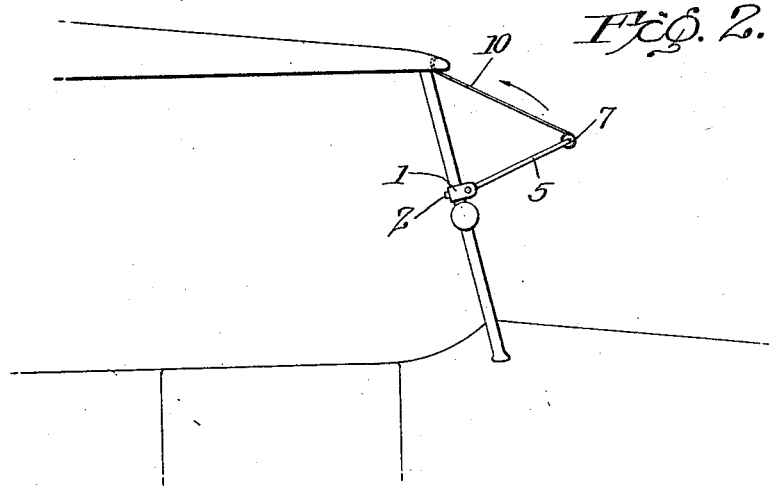
James J. Gough,
INVENTOR

J. J. GOUGH.
SHIELD FOR MOTOR VEHICLES.
APPLICATION FILED DEC. 7, 1920.

1,413,475.

Patented Apr. 18, 1922.
2 SHEETS—SHEET 2.

James J. Gough,
INVENTOR

BY Victor J. Evans
ATTORNEY

WITNESS:
G. T. Baker.
L. B. Middleton

UNITED STATES PATENT OFFICE.

JAMES J. GOUGH, OF CHICAGO, ILLINOIS.

SHIELD FOR MOTOR VEHICLES.

1,413,475.   Specification of Letters Patent.   Patented Apr. 18, 1922.

Application filed December 7, 1920. Serial No. 429,041.

*To all whom it may concern:*

Be it known that I, JAMES J. GOUGH, a citizen of the United States, residing at Chicago, in the county of Cook and State of Illinois, have invented new and useful Improvements in Shields for Motor Vehicles, of which the following is a specification.

This invention relates to a sun and rain shield for the windshield of automobiles, the general object of the invention being to provide an awning like shield which is mainly located at the top of the windshield and which may be swung downwardly, when desired, to shield the upper part of the windshield from the sun and rain so as to provide a clear vision for the driver.

Another object of the invention is to provide a spring roller upon which the cloth part of the shield is wound and which tends to hold the device in inoperative position with the cloth rolled upon the roller.

A further object of the invention is to provide brackets for detachably connecting the device with the windshield frame and which are arranged to hold the device in operative position.

This invention also consists in certain other features of construction and in the combination and arrangement of the several parts, to be hereinafter fully described, illustrated in the accompanying drawings and specificially pointed out in the appended claim.

In describing my invention in detail, reference will be had to the accompanying drawings wherein like characters denote like or corresponding parts throughout the several views, and in which:—

Figure 1 is a front view of a portion of an automobile showing my invention applied thereto.

Figure 2 is a side view of Figure 1 with the improved shield in lowered position.

Figure 3:
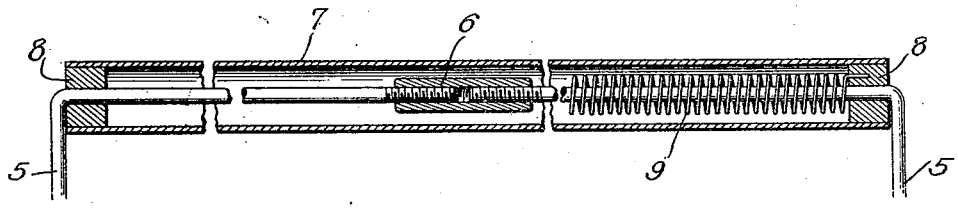
Figure 3 is an enlarged sectional view through the roller.
Figure 4:
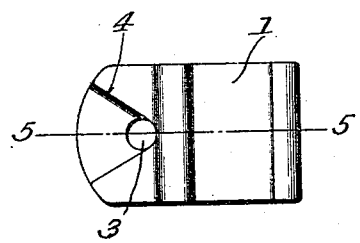
Figures 4 and 5 are detail views of one of the brackets.
Figure 5:
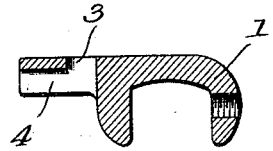

In these views A indicates the windshield of an automobile and B a portion of the top of the automobile.

In carrying out my invention I provide a pair of brackets 1 which are adapted to be clamped to the windshield frame by means of the screws 2. Each bracket is provided with a hole 3 and a V-shaped notch 4 to receive the bent ends of the arms 5 so that said arms are pivotally supported by said brackets. The arms are formed of spring material so that when they are swung downwardly at an angle from the windshield they will spring into notches 4 and thus be prevented from being swung upwardly again until they are forced towards each other to free them from the notches. The arms are of angle shape with their free ends in alignment and screwthreaded to engage a screw threaded bushing 6 whereby said arms are connected together. These arms support the roller 7 which is of hollow construction and has its ends closed by plugs 8 which form bearings for the arms. A coil spring 9 is located in the roller and has one end secured to the bushing 6 and its other end to one of the plugs 8. The curtain 10, which is preferably made of the same material as the top of the automobile, has one end secured to the roller and its other end secured to either the front bow of the top or to the top part of the windshield.

The parts are so arranged that the spring will hold the parts with the curtain wound upon the roller and the arms in their upper position with the roller adjacent to or resting against the top part of the windshield. When the device is to be used to shield the driver from the sun or rain or snow the arms 5 are pressed downwardly and outwardly until they snap into the notches 4. This movement of the arms will unwind the curtain from the roller so that it will be stretched at an angle from the top of the windshield downwardly and outwardly, as shown in Figure 2, and the parts will remain in this position due to the fact that the arms are held in the notches by their spring action and also by the action of the spring in the roller pulling the arms against one wall of each notch. When it is not desired to use the device any more it is simply necessary to force the arms outwardly to free them of the notches and permit the spring in the roller to rotate the roller to wind up the curtain and swing the parts to their inoperative position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with an automobile and its windshield, a pair of brackets clamped to the windshield frame, each bracket having an opening and a V-shaped notch formed therein, angle arms having their ends bent and pivotally supported by said brackets, a screwthreaded bushing engaging said arms whereby these arms are connected together, a hollow roller having its ends closed and supported by said arms, plugs closing the end of said hollow roller, a coil spring located in the roller and having one end secured to the bushing and its remaining end to one of the plugs, a curtain having one end secured to the roller and its other end secured to the top part of the windshield.

In testimony whereof I affix my signature.

JAMES J. GOUGH.